United States Patent
Onggosanusi et al.

(10) Patent No.: US 11,497,021 B2
(45) Date of Patent: Nov. 8, 2022

(54) METHOD AND APPARATUS FOR FAST BEAM MANAGEMENT

(71) Applicant: Samsung Electronics Co., Ltd., Suwon-si (KR)

(72) Inventors: Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/949,246

(22) Filed: Oct. 21, 2020

(65) Prior Publication Data

US 2021/0136741 A1 May 6, 2021

Related U.S. Application Data

(60) Provisional application No. 62/930,482, filed on Nov. 4, 2019, provisional application No. 62/937,962, filed on Nov. 20, 2019.

(51) Int. Cl.
 *H04W 4/00* (2018.01)
 *H04W 72/04* (2009.01)
(52) U.S. Cl.
 CPC ....... *H04W 72/046* (2013.01); *H04W 72/042* (2013.01); *H04W 72/0413* (2013.01)
(58) Field of Classification Search
 None
 See application file for complete search history.

(56) References Cited

U.S. PATENT DOCUMENTS

| 9,686,798 | B1* | 6/2017 | Zhao | H04W 72/1257 |
| 11,251,931 | B2* | 2/2022 | Zhou | H04W 48/06 |
| 2019/0115955 | A1* | 4/2019 | John Wilson | H04W 72/042 |
| 2019/0222289 | A1* | 7/2019 | John Wilson | H04W 72/046 |
| 2019/0253220 | A1* | 8/2019 | Kim | H04L 5/0044 |
| 2020/0053757 | A1* | 2/2020 | Bagheri | H04W 24/08 |
| 2020/0107310 | A1* | 4/2020 | Wang | H04B 7/088 |
| 2020/0120584 | A1* | 4/2020 | Yi | H04L 5/0048 |
| 2020/0178239 | A1* | 6/2020 | Yi | H04L 5/0053 |
| 2020/0280409 | A1* | 9/2020 | Grant | H04L 5/0023 |

(Continued)

FOREIGN PATENT DOCUMENTS

EP 3046386 A1 7/2016

OTHER PUBLICATIONS

Catt, "Remaining details on beam management," R1-1720182, 3GPP TSG RAN WG1 Meeting 91, Reno, USA, Nov. 27-Dec. 1, 2017, 11 pages.

(Continued)

*Primary Examiner* — Clemence S Han

(57) ABSTRACT

Methods and apparatuses for fast beam selection. A method for operating a user equipment (UE) includes receiving configuration information on a set of transmission configuration information (TCI) states. Each of the TCI states refers to at least one source reference signal (RS) with a corresponding quasi co-location (QCL) and is associated with downlink (DL) data and UE-specific DL control information (DCI). The method further includes receiving a TCI state update on a physical downlink control channel (PDCCH), decoding the TCI state update, and applying the TCI state update to a reception of DL data and a corresponding UE-specific DL assignment.

18 Claims, 10 Drawing Sheets

(56) References Cited

U.S. PATENT DOCUMENTS

| | | | | |
|---|---|---|---|---|
| 2020/0389874 | A1* | 12/2020 | Lin | H04L 5/0096 |
| 2020/0389883 | A1* | 12/2020 | Faxér | H04L 5/0025 |
| 2021/0135801 | A1* | 5/2021 | Zhou | H04L 5/0023 |
| 2021/0159966 | A1* | 5/2021 | Xi | H04L 5/0023 |
| 2021/0258813 | A1* | 8/2021 | Li | H04W 80/02 |
| 2022/0039129 | A1* | 2/2022 | Takeda | H04W 72/046 |

OTHER PUBLICATIONS

LG Electronics, "Feature lead summary of Enhancements on Multi-beam Operations," R1-1909486, 3GPP TSG RAN WG1 Meeting #98, Prague, CZ, Aug. 26-30, 2019, 35 pages.

Qualcomm, "Beam management for NR," R1-1718541, 3GPP TSG-RAN WG1 Meeting #90bis, Prague, P.R. Czechia, Oct. 9-13, 2017, 17 pages.

Samsung, "DCI Contents and Formats," R1-1800445, 3GPP TSG RAN WG1 Meeting AH 1801, Vancouver, Canada, Jan. 22-26, 2018, 3 pages.

International Search Report of the International Searching Authority dated Jan. 29, 2021 in connection with International Application No. PCT/KR2020/015080, 3 pages.

Written Opinion of the International Searching Authority dated Jan. 29, 2021 in connection with International Application No. PCT/KR2020/015080, 4 pages.

"LTE; Evolved Universal Terrestrial Radio Access (E-UTRA); Physical channels and modulation (3GPP TS 36.211 version 12.4.0 Release 12)", Feb. 2015, 126 pages.

"LTE; Evolved Universal Terrestrial Radio Access (E-UTRA); Multiplexing and channel coding (3GPP TS 36.212 version 12.3.0 Release 12)", Feb. 2015, 91 pages.

"LTE; Evolved Universal Terrestrial Radio Access (E-UTRA); Physical layer procedures (3GPP TS 36.213 version 12.4.0 Release 12)", Feb. 2015, 227 pages.

"LTE; Evolved Universal Terrestrial Radio Access (E-UTRA); Medium Access Control (MAC) protocol specification 3GPP TS 36.321 version 12.4.0 Release 12)", Feb. 2015, 62 pages.

"LTE; Evolved Universal Terrestrial Radio Access (E-UTRA); Radio Resource Control (RRC); Protocol specification 3GPP TS 36.331 version 12.4.1 Release 12)", Feb. 2015, 415 pages.

"3rd Generation Partnership Project; Technical Specification Group Radio Access Network; NR; Physical channels and modulation (Release 15)", 3GPP TS 38.211 V15.0.0, Dec. 2017, 73 pages.

"3rd Generation Partnership Project; Technical Specification Group Radio Access Network; NR; Multiplexing and channel coding (Release 15)", 3GPP TS 38.212 V15.0.0, Dec. 2017, 82 pages.

"3rd Generation Partnership Project; Technical Specification Group Radio Access Network; NR; Physical layer procedures (Release 15)", 3GPP TS 38.213 V15.0.0, Dec. 2017, 56 pages.

"3rd Generation Partnership Project; Technical Specification Group Radio Access Network; NR; Physical layer procedures for data (Release 15)", 3GPP TS 38.214 V15.0.0, Dec. 2017, 71 pages.

"3rd Generation Partnership Project; Technical Specification Group Radio Access Network; NR; Medium Access Control (MAC) protocol specification (Release 15)", 3GPP TS 38.321 V15.0.0, Dec. 2017, 55 pages.

"3rd Generation Partnership Project; Technical Specification Group Radio Access Network; NR; Radio Resource Control (RRC) protocol specification (Release 15)", 3GPP TS 38.331 V15.0.0, Dec. 2017, 188 pages.

"3rd Generation Partnership Project; Technical Specification Group Radio Access Network; NR; Physical layer measurements (Release 15)", 3GPP TS 38.215, V15.0.0, Dec. 2017, 13 pages.

Extended European Search Report dated Sep. 19, 2022 regarding Application No. 20885145.1, 7 pages.

* cited by examiner

METHOD AND APPARATUS FOR FAST BEAM MANAGEMENT

CROSS-REFERENCE TO RELATED APPLICATIONS AND CLAIM OF PRIORITY

This application claims priority to U.S. Provisional Patent Application No. 62/930,482 filed Nov. 4, 2019 and U.S. Provisional Patent Application No. 62/937,962 filed Nov. 20, 2019. The above-identified provisional patent applications are hereby incorporated by reference in their entirety.

TECHNICAL FIELD

The present disclosure relates generally to wireless communication systems and, more specifically, beam selection for multi-beam system.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Various embodiments of the present disclosure provide methods and apparatuses for low-latency beam selection.

In one embodiment, a user equipment (UE) is provided. The UE includes a transceiver configured to receive configuration information on a set of transmission configuration indicator (TCI) states and receive a TCI state update on a physical downlink control channel (PDCCH). Each of the TCI states refers to at least one source reference signal (RS) with a corresponding quasi co-location (QCL) and is associated with downlink (DL) data and UE-specific DL control information (DCI). The UE also includes a processor operably connected to the transceiver. The processor is configured to decode the TCI state update and apply the TCI state update to a reception of DL data and a corresponding UE-specific DL assignment.

In another embodiment, a base station (BS) is provided. The BS includes a processor configured to generate configuration information on a set of TCI states. Each of the TCI states refers to at least one source RS with a corresponding QCL and is associated with DL data and UE-specific DCI. The BS also includes a transceiver operably connected to the processor. The transceiver is configured to transmit the configuration information and transmit a TCI state update on a physical PDCCH. The TCI state update is associated with a reception of DL data and a corresponding UE-specific DL assignment.

In yet another embodiment, a method for operating a UE is provided. The method includes receiving configuration information on a set of TCI states. Each of the TCI states refers to at least one source RS with a corresponding QCL and is associated with DL data and UE-specific DCI. The method further includes receiving a TCI state update on a PDCCH, decoding the TCI state update, and applying the TCI state update to a reception of a DL data and a corresponding UE-specific DL assignment.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
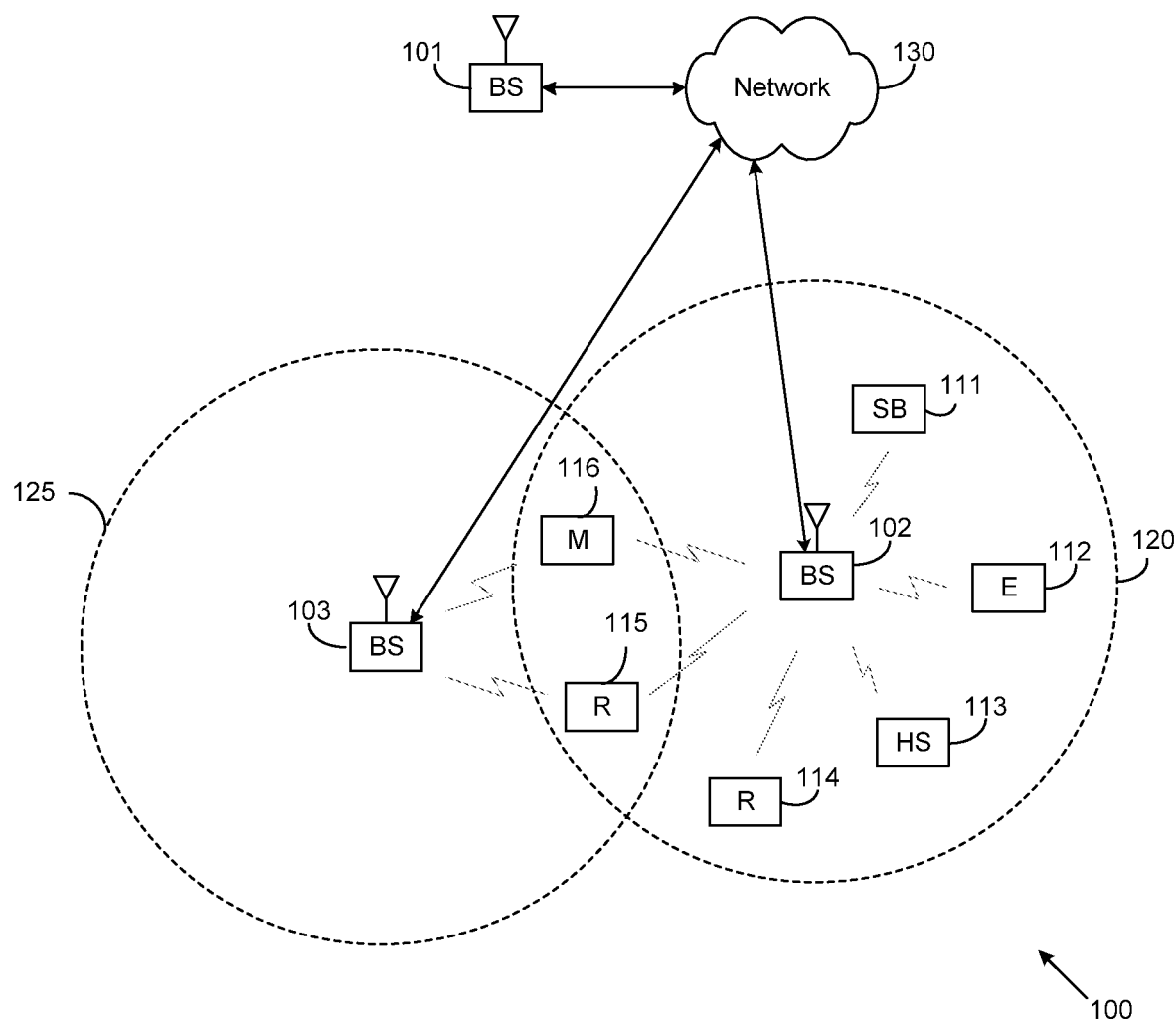
FIG. 1 illustrates an example wireless network according to various embodiments of the present disclosure.

FIGS. 1 through 12, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); 3GPP TS 38.331 version 15.0.0, "NR, Radio Resource Control (RRC) Protocol Specification" ("REF 11"); and 3GPP TS 38.215 version 15.0.0, "NR, Physical Layer Measurements" ("REF 12")".

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 28 GHz or 60 GHz bands or, in general, above 6 GHz bands, so as to accomplish higher data rate, or in lower frequency bands, such as below 6 GHz, to enable robust coverage and mobility supports. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmits beam reporting information to UEs 111-116 and configure UEs 111-116 for beam reporting as described in embodiments of the present disclosure. In various embodiments, one or more of UEs 111-116 receive beam reporting information as described in embodiments of the present disclosure.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
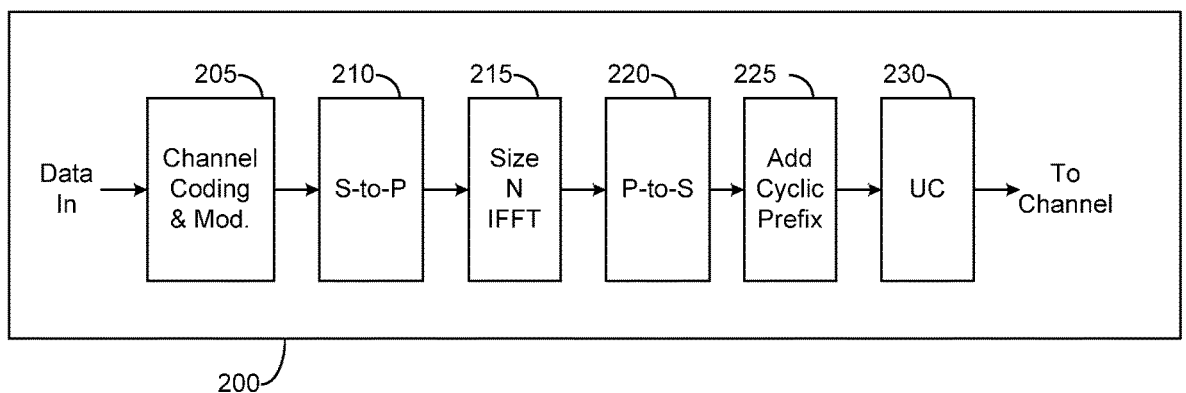
FIGS. 2A and 2B illustrate example wireless transmit and receive paths according to various embodiments of the present disclosure.
Figure 2B:
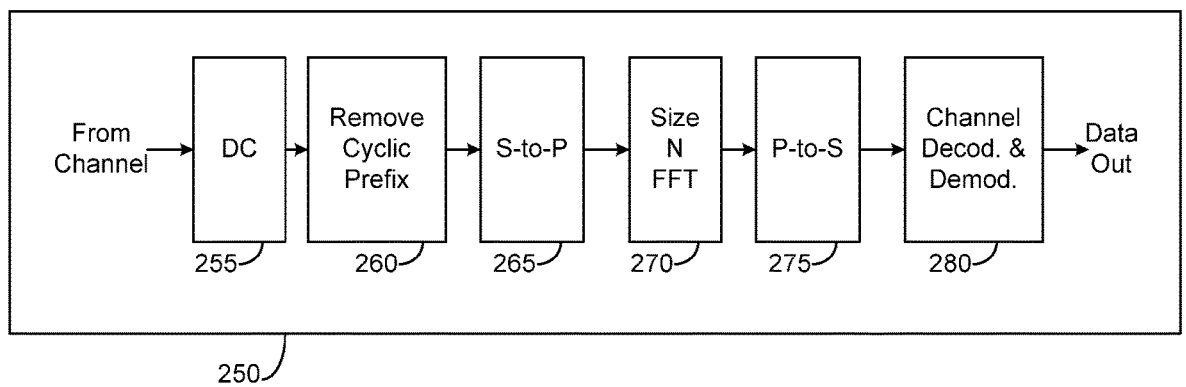

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB and that the transmit path 200 can be implemented in a UE. In some embodiments, the receive path 250 is configured to receive beam reporting information as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for beam reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
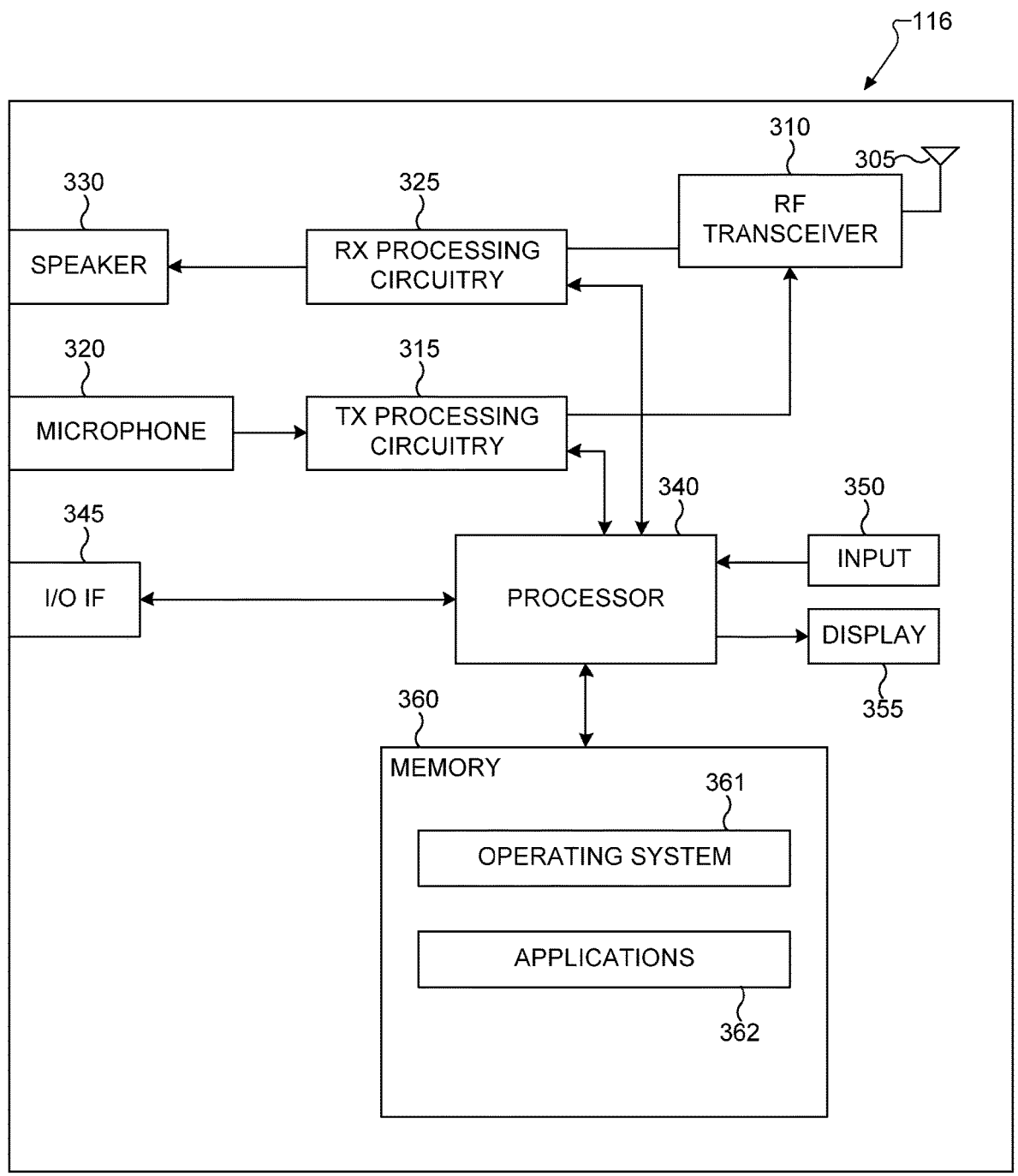
FIG. 3A illustrates an example UE according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for fast beam management for systems described in embodiments of the present disclosure as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 can perform signaling and calculation for low-latency beam selection. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
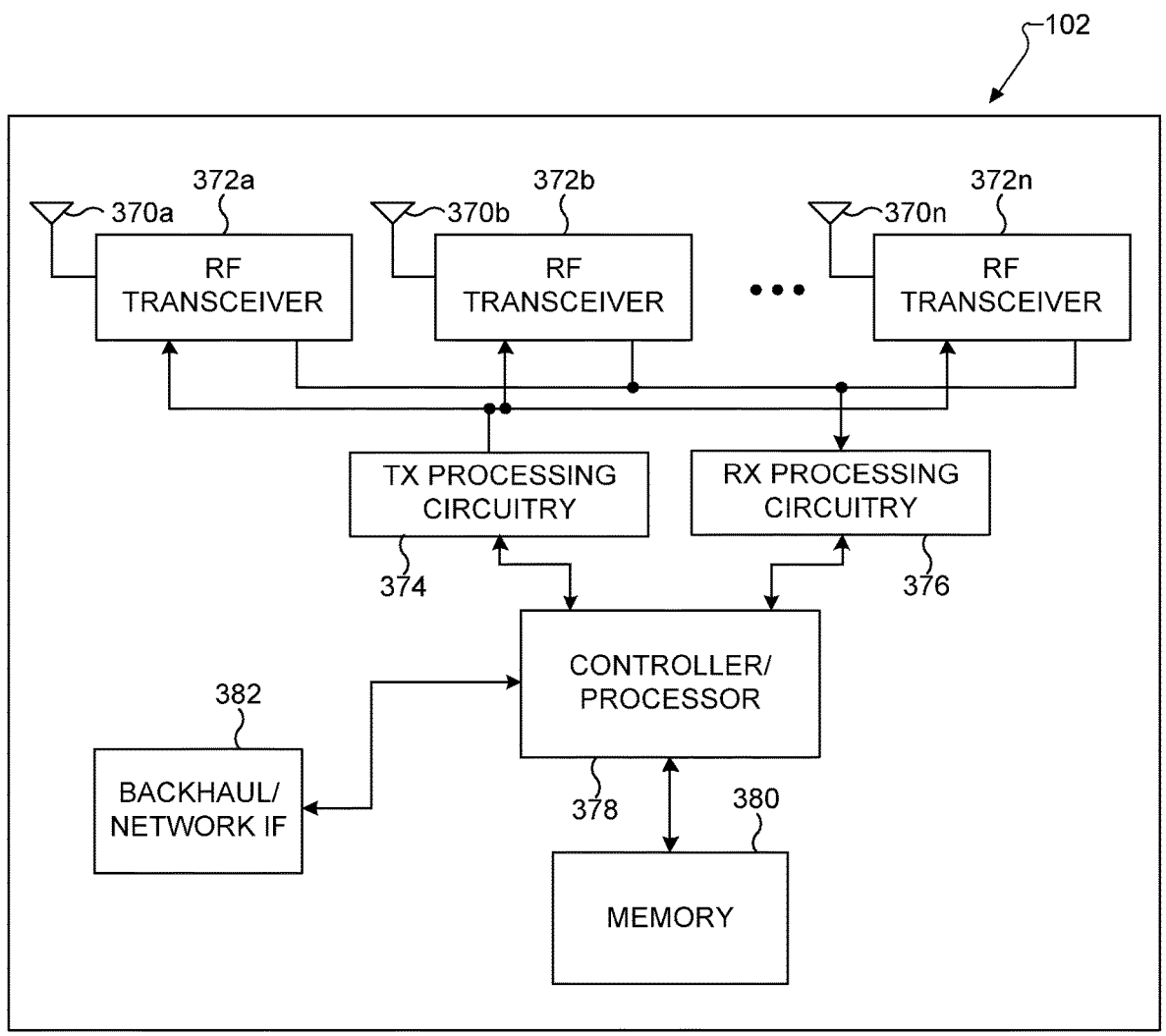
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) transmits configuration information for low-latency beam selection to a UE.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE and Rel.15 NR. For next generation cellular systems such as 5G, it is expected that the maximum number of CSI-RS ports remain more or less the same.

Figure 4:
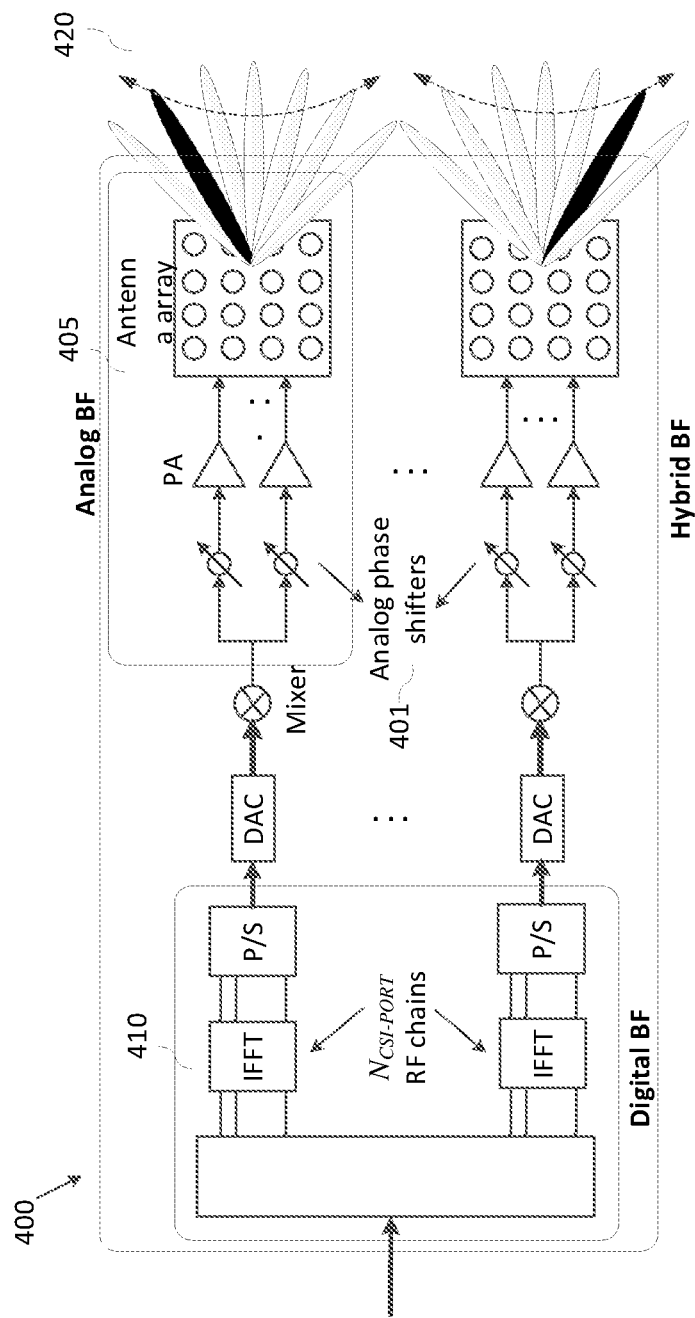
FIG. 4 illustrates an example beamforming architecture for a transmitter wherein one channel state information reference signal (CSI-RS) port is mapped onto a large number of analog-controlled antenna elements according to various embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by transmitter 400 of FIG. 4. For example, transmitter 400 may be present in the gNB 102 or the UE 116 of FIG. 1. The embodiment of the transmitter 400 shown in FIG. 4 is for illustration only, and other transmitters can have the same or similar configuration.

In the embodiment illustrated in FIG. 4, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the $O_2$ absorption loss around 60 GHz frequency (~10 dB additional loss @ 100 m distance), larger number of and sharper analog beams (hence larger number of radiators in the array) will be needed to compensate for the additional path loss.

In Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be non-zero power (NZP) CSI-RS and/or SSB (synchronization signal block, which includes primary synchronization signal, secondary synchronization signal, and PBCH). Here, DL beam indication is done via the TCI field in DL-related downlink control information (DCI) which includes an index to one (e.g., only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (e.g., only one) reference RS. This linkage is configured via higher-layer signaling using the SpatialRelationInfo RRC parameter. Essentially, only one TX beam may be indicated to the UE.

In Rel.15/16 NR, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, Rel.15/16 beam management becomes cumbersome and is unlikely able to keep up with more aggressive use cases which require large number of beams and fast beam switching (e.g. higher frequency bands, high mobility, and/or larger number of narrower analog beams). In addition, Rel.15/16 was designed to accommodate a number of unknown or rudimentary capabilities (e.g. UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

Therefore, there is a need for efficient designs of components used for beam management. Here, efficiency includes lower overhead (especially pertaining to configuration, reconfiguration, and control signaling) and lower latency (faster updates).

In the following, for brevity, both FDD and TDD are considered as the duplex method for both DL and UL signaling.

Although example descriptions and embodiments to follow assume orthogonal frequency division multiplexing (OFDM) or orthogonal frequency division multiple access (OFDMA), embodiments of the present disclosure can be extended to other OFDM-based transmission waveforms or multiple access schemes such as filtered OFDM (F-OFDM).

This disclosure covers several components which can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

Terminology such as UL TX beam is used for illustrative purposes and therefore not normative. Other terms such as UL transmit spatial filter, referring to a spatial filtering operation applied by the UE on a transmitted UL signal, can also be used to represent the same functions.

A "reference RS" corresponds to a set of characteristics of UL TX beam (or UL transmit spatial filter), such as direction, precoding/beamforming, number of ports, etc. For instance, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam to the UE. Optionally, the reference RS can be transmitted by the UE (in this case, the reference RS is a downlink signal such as SRS or DMRS). As the NW/gNB receives the reference RS, the NW/gNB can measure and calculate the information to assign a particular UL TX beam to the UE. This option is applicable when DL-UL beam pair correspondence holds or is assumed.

The reference RS can be dynamically triggered by the NW/gNB (e.g. via DCI in case of AP RS), preconfigured with a certain time-domain behavior (such as periodicity and offset, in case of periodic RS), or a combination of such pre-configuration and activation/deactivation (in case of semi-persistent or SP RS).

The following embodiment is an example of DL multi-beam operation that utilizes DL beam indication after the network (NW) receives some transmission from the UE. In the first example embodiment, AP CSI-RS is transmitted by the NW and measured by the UE. Although AP RS is used in these two examples, periodic or SP RS can also be used.

For mmWave (or FR2) or higher frequency bands (such as >52.6 GHz or FR4) where multi-beam operation is especially relevant, transmission-reception process includes the receiver to select a receive (RX) beam for a given TX beam. For UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

In the present disclosure, the term "resource indicator," also abbreviated as REI, is used to refer to an indicator of RS resource used for signal/channel and/or interference measurement. This term is used for illustrative purposes and hence can be substituted with any other term that refers to the same function. Examples of REI include the aforementioned CSI-RS resource indicator (CRI) and SSB resource indicator (SSB-RI). Any other RS can also be used for signal/channel and/or interference measurement such as DMRS.

Figure 5A:
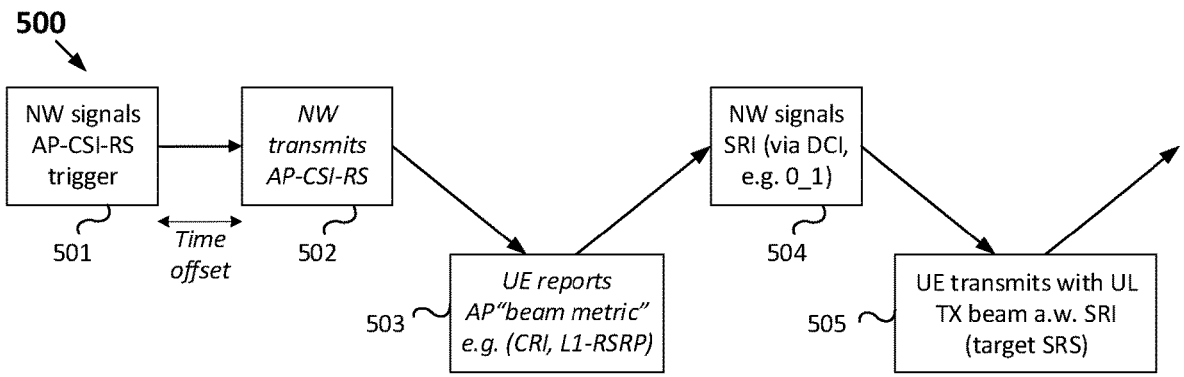
FIG. 5A illustrates a flow diagram of example uplink (UL) beam management with aperiodic (AP) CSI-RS triggering and beam reporting according to one or more embodiments of the present disclosure.
Figure 5B:
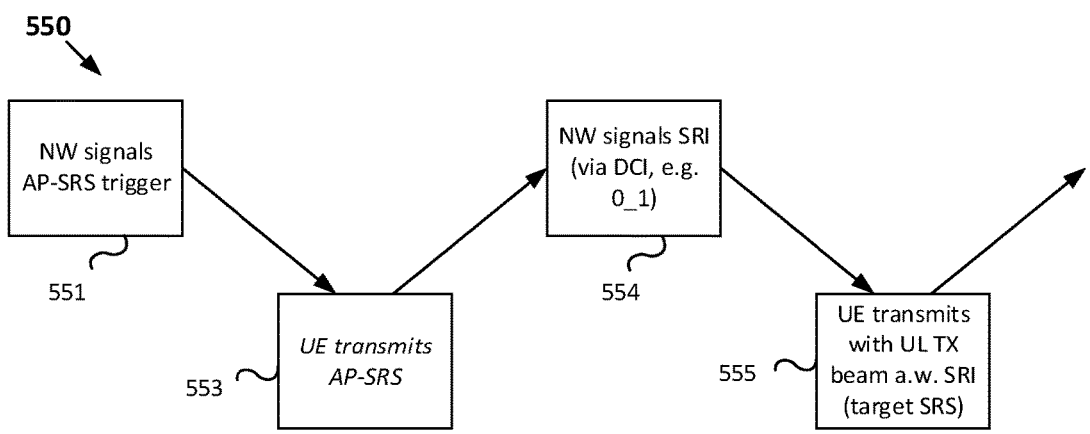
FIG. 5B illustrates a flow diagram of example UL beam management with AP sounding reference signal (SRS) triggering according to one or more embodiments of the present disclosure.

FIGS. 5A and 5B illustrate flow diagrams of example uplink (UL) beam management with AP CSI-RS triggering and beam reporting and example UL beam management with AP SRS triggering, respectively, according to one or more embodiments of the present disclosure. The embodiments shown in FIGS. 5A and 5B are for illustration only. Other embodiments can be used without departing from the scope of the present disclosure.

In one example illustrated in FIG. 5A, an UL multi-beam operation 500 starts with the gNB/NW (e.g., gNB 102) signaling to a UE (e.g., UE 116) an AP CSI-RS trigger or indication (step 501). This trigger or indication can be included in a DCI (either UL-related or DL-related, either separately or jointly signaled with an AP CSI request/ trigger) and indicate transmission of AP-CSI-RS in a same (zero time offset) or later slot/sub-frame (>0 time offset). Upon receiving the AP-CSI-RS transmitted by the gNB/NW (step 502), the UE measures the AP-CSI-RS and, in turn, calculates and reports a "beam metric" (indicating quality of a particular TX beam hypothesis) (step 503). Examples of such beam reporting are CSI-RS resource indicator (CRI) or SSB resource indicator (SSB-RI) coupled with its associated L1-RSRP/L1-RSRQ/L1-SINR/CQI. Upon receiving the beam report from the UE, the NW can use the beam report to select an UL TX beam for the UE and indicate the UL TX beam selection (step 504) using the SRI field in the UL-related DCI (that carries the UL grant, such as DCI format 0_1 in NR). The SRI corresponds to a "target" SRS resource that is linked to a reference RS (in this case, an AP-CSI-RS) via SpatialRelationInfo configuration. Upon successfully decoding the UL-related DCI with the SRI, the UE performs UL transmission (such as data transmission on PUSCH) with the UL TX beam associated with the SRI (step 505).

In another example illustrated in FIG. 5B, an UL multi-beam operation 550 starts with the gNB/NW (e.g., gNB 102) signaling to a UE (e.g., UE 116) an AP-SRS trigger or request (step 551). This trigger can be included in a DCI (either UL-related or DL-related). Upon receiving and decoding the AP-SRS trigger (step 552), the UE transmits AP-SRS to the gNB/NW (step 553) so that the NW (or gNB) can measure the UL propagation channel and select an UL TX beam for the UE. The gNB/NW can then indicate the UL TX beam selection (step 554) using the SRI field in the UL-related DCI (that carries the UL grant, such as DCI format 0_1 in NR). The SRI corresponds to a "target" SRS resource that is linked to a reference RS (in this case, an AP-SRS) via SpatialRelationInfo configuration. Upon successfully decoding the UL-related DCI with the SRI, the UE performs UL transmission (such as data transmission on PUSCH) with the UL TX beam associated with the SRI (step 555).

In the above two example embodiments, only one UL TX beam is indicated to the UE. Extension for multi panel UEs can be deduced by those familiar with the arts.

Figure 6:
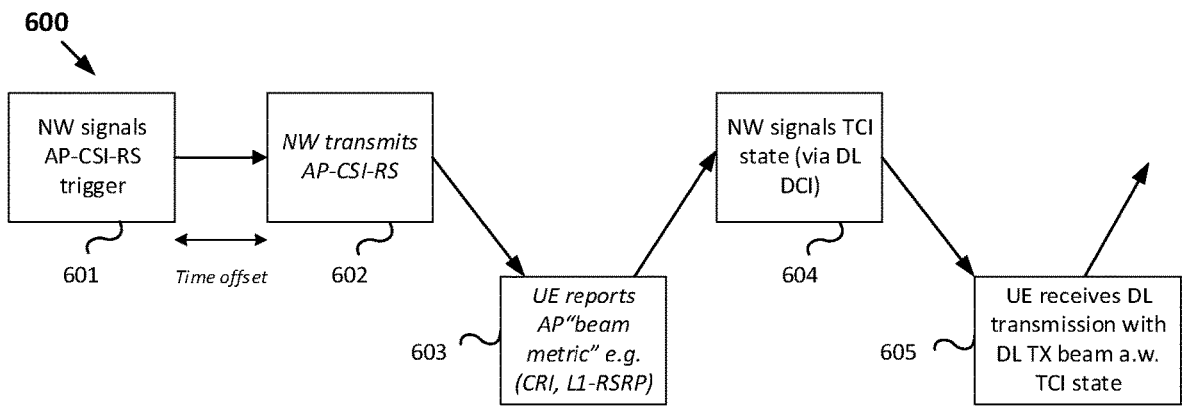
FIG. 6 illustrates a flow diagram of example DL beam management with aperiodic (AP) CSI-RS triggering and beam reporting according to one or more embodiments of the present disclosure.

FIG. 6 illustrates a flow diagram of example DL beam management with AP CSI-RS triggering and beam reporting according to one or more embodiments of the present disclosure. The embodiments shown in FIG. 6 are for illustration only. Other embodiments can be used without departing from the scope of the present disclosure.

In another example illustrated in FIG. 6, wherein a UE is configured for measuring/receiving aperiodic CSI-RS (AP-CSI-RS) and reporting aperiodic CSI (AP CSI), a DL multi-beam operation 600 starts with the gNB/NW signaling to a UE an aperiodic CSI-RS (AP-CSI-RS) trigger or indication (step 601). This trigger or indication can be included in a DCI (either UL-related or DL-related, either separately or jointly signaled with an aperiodic CSI request/ trigger) and indicate transmission of AP-CSI-RS in a same (zero time offset) or later slot/sub-frame (>0 time offset). Upon receiving the AP-CSI-RS transmitted by the gNB/NW (step 602), the UE measures the AP-CSI-RS and, in turn, calculates and reports a "beam metric" (included in the CSI, indicating quality of a particular TX beam hypothesis) (step 603). Examples of such beam reporting (supported in Rel.15/16 NR) are CSI-RS resource indicator (CRI) or SSB resource indicator (SSB-RI) coupled with its associated L1-RSRP and/or L1-SINR. Upon receiving the beam report from the UE, the NW/gNB can use the beam report to select a DL TX beam for the UE and indicate the DL TX beam selection (step 604) using the TCI field in the DL-related DCI (that carries the DL assignment, such as DCI format 1_1 in NR). The TCI state corresponds to a reference RS (in this case, an AP-CSI-RS) defined/configured via the TCI state definition (higher-layer/RRC configured, from which a subset is activated via MAC CE for the DCI-based selection). Upon successfully decoding the DL-related DCI with the TCI field, the UE performs DL reception (such as data transmission on PDSCH) with the DL TX beam associated with the TCI field (step 605). In this example embodiment, only one DL TX beam is indicated to the UE.

To facilitate fast beam management, one goal is to streamline the foundational components (building blocks) for beam management. One functionality of beam management is beam selection which comprises functions such as beam measurement (including training), reporting (for DL beam management, reporting via UL control channel(s)), and indication (for DL and UL beam management, indication via DL control channel(s)). Once the building blocks are streamlined [step 1], additional advanced features to facilitate faster beam management can be added [step 2].

In the present disclosure, the term "slim mode" is used for illustrative purposes to refer to streamlined designs of such foundational components [step 1]. The slim-mode design, due to its compact nature, can facilitate faster update/ reconfiguration via lower-layer control signaling. In other words, L1 control signaling will be the primary signaling mechanism and higher-layer (such as MAC CE or RRC) is used only when necessary. Here, L1 control signaling includes the use of UE-group DCI as well as dedicated (UE-specific) DCI.

The aforementioned additional advanced features can include extensions of beam management (multi-beam operation) from intra-cell to inter-cell mobility. With such mechanism, seamless access/mobility for RRC_CONNECTED UEs—as if cell boundaries were not observed unless a UE is in initial access or initial-access-like condition—can be achieved. Another advanced feature includes mechanisms to minimize beam failure (BF) or radio link failure (RLF) such as low-overhead faster beam switching/selection and UE-initiated/event-triggered beam management. With such preventive mechanisms in place, beam failure recovery (BFR) will be less likely used.

The present disclosure includes the following components. A first component includes example embodiments for TCI state update, including the so-called QCL linkage. A second component includes example embodiments for beam measurement and reporting. A third component includes example embodiments for DL beam indication. A fourth component includes example embodiments for UL beam indication. Each of these components is designed to facilitate fast beam management and can stand in its own or utilized in conjunction with at least another component.

For the first component (that is, UE procedures for TCI state update), in Rel.15/16 NR, the DL spatial relation (such as QCL Type D which implies that two TX beams are associated with the same RX beam) is configured based on TCI state definition while UL spatial relation is configured via SpatialRelationInfo. The two configurations share neither the same framework nor the same signaling mechanism. For DL, the UE is indicated a DL TX beam via the TCI field in the respective DL-related DCI (which is a reference to the TX spatial filter/beam used by the associated SSB/CSI-RS resource). For UL, the UE is indicated an UL TX beam via the SRI field in the respective UL-related DCI (since UL beam indication is tied to UL transmission). This setup is not only inefficient but also creates unnecessary complication when DL RS is used for UL beam indication and vice versa. In particular, the link between source (reference) RS and target SRS is unnecessary for UL beam indication. The TCI state definition can be configured via higher-layer (RRC) signaling. Optionally, the TCI state definition can be configured via MAC CE. Optionally, a subset of the TCI states can be activated or selected either via MAC CE or L1 control signaling (via either UE-group DCI where a set of UEs share a same TCI state subset, or UE-specific/dedicated DCI). This subset constitutes the TCI states represented by the code points of the TCI field in the corresponding DCI. This update/activation can be performed in either one shot or incrementally. The TCI state indicated by the code point of the TCI field is a reference to the TX beam or the TX spatial filter associated with a reference RS. For DL, given such a reference, the UE can further derive the RX beam or RX spatial filter. The DCI that includes the TCI field (which can be either DL-related DCI or UL-related DCI) performs the function of the so-called "beam indication".

Figure 7:
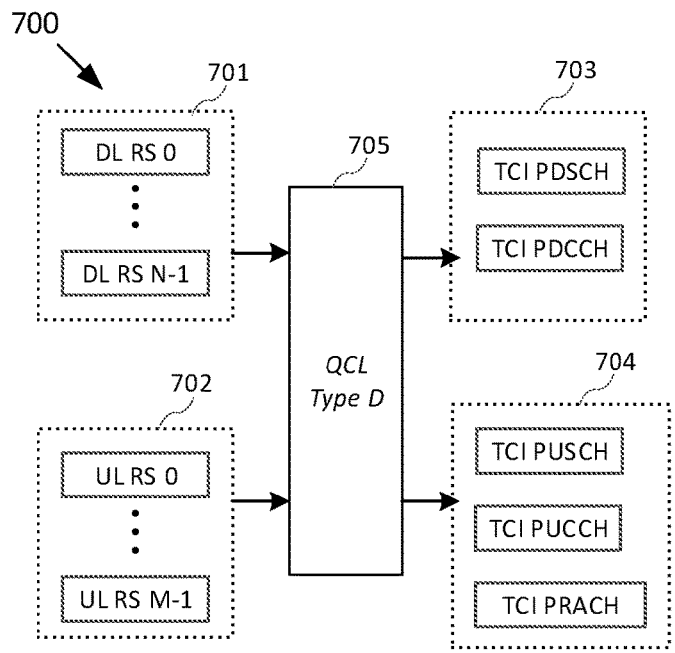
FIG. 7 illustrates an example QCL configuration according to one or more embodiments of the present disclosure.

FIG. 7 illustrates an example QCL configuration according to one or more embodiments of the present disclosure. The embodiments shown in FIG. 7 are for illustration only. Other embodiments can be used without departing from the scope of the present disclosure.

In the following embodiments, the same TCI-based mechanism is used for both DL and UL beam indications. This is partly illustrated in diagram 700 of FIG. 7 wherein M DL RSs (701) and N UL RSs (702) can be utilized for source (reference) RS. Examples of DL RS include NZP CSI-RS, SSB, and DL DMRS. Examples of UL RS include SRS and UL DMRS. The RSs in 701 and 702 can be used for the purpose of reference RSs for DL and UL beam indications. Here, the TCI-based mechanism links/associates at least one of the RSs from 701 and/or 702 to a particular TCI state for a channel (e.g., TCI PDSCH 703 and TCI PUSCH/PRACH 704, respectively). For instance, DL RS 0 can be associated with the first TCI state for PDSCH and UL RS 0 with the second TCI state for PDSCH (wherein at least two TCI states are configured for PDSCH). Likewise, DL RS 1 can be associated with the first TCI state for PUSCH and UL RS 1 with the second TCI state for PUSCH (wherein at least two TCI states are configured for PUSCH). Such association (705) can take form of the QCL Type D. For DL, two relevant channels include PDSCH and PDCCH (at least for PDCCH used for the purpose of UE-specific control reception) while for UL, three relevant channels include PUSCH, PUCCH, and PRACH. Other components of this TCI-based mechanism such as target RS may or may not be needed.

Several embodiments pertaining to the above TCI-based mechanism are described below.

In one embodiment (I.1.1), the TCI state definition for each of the channels can be configured separately from other channels. An example of this embodiment can be illustrated in diagram 700 of FIG. 7.

Figure 8:
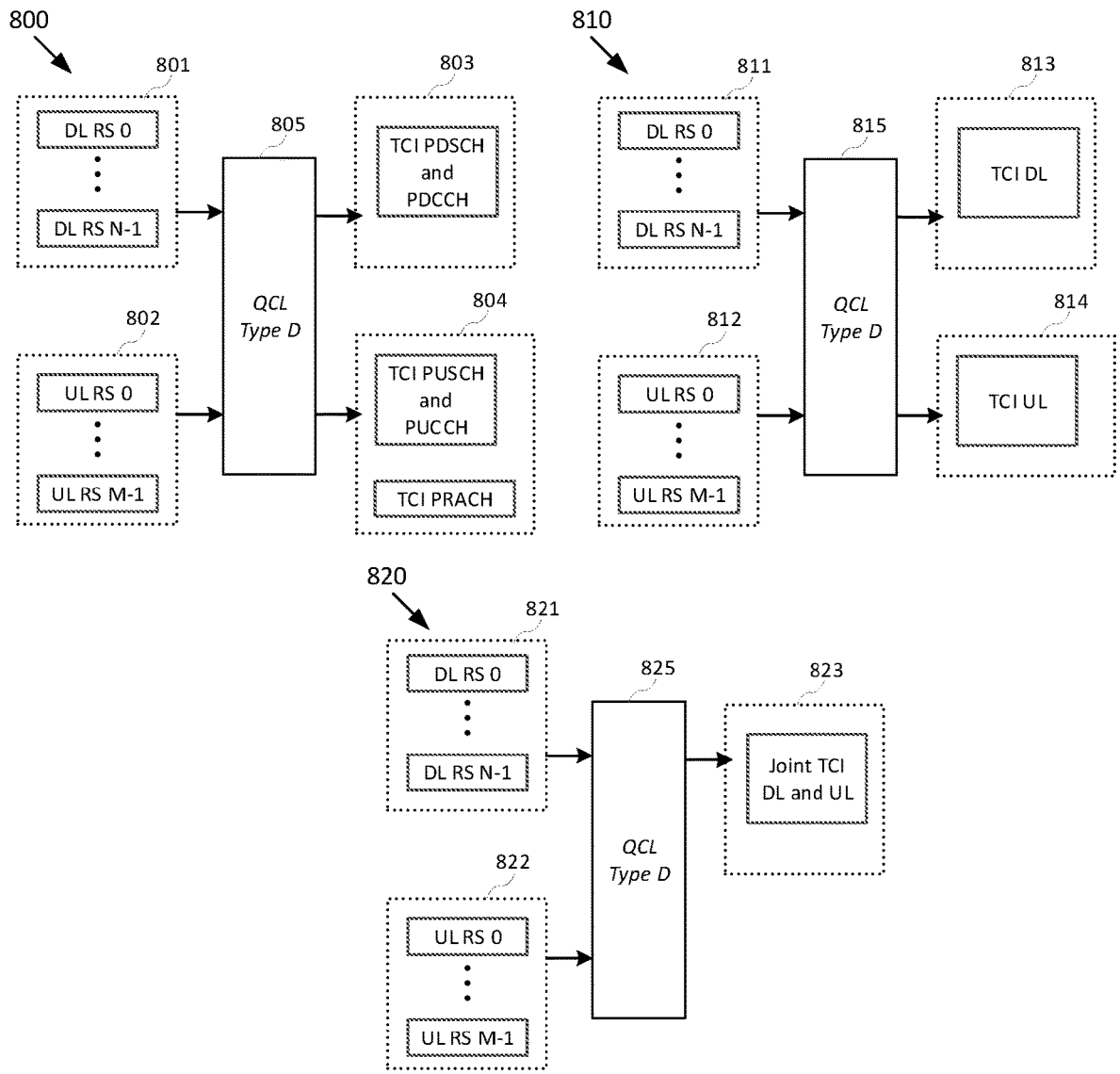
FIG. 8 illustrates examples of QCL configurations according to one or more embodiments of the present disclosure.

FIG. 8 illustrates examples of QCL configurations according to one or more embodiments of the present disclosure. The embodiments shown in FIG. 8 are for illustration only. Other embodiments can be used without departing from the scope of the present disclosure.

In another embodiment (I.1.2), the TCI state definition for at least two of the channels are jointly configured. An example of this embodiment can be illustrated in diagram 800 of FIG. 8 wherein a TCI state definition is jointly used for PDSCH and PDCCH 803 (at least for PDCCH used for the purpose of UE-specific control reception), and another TCI state definition is jointly used for PUSCH and PUCCH 804. Here, the TCI-based mechanism links/associates at least one of the RSs from 801 and/or 802 to a particular TCI state for the channel. Such association (805) can take form of the QCL Type D. This is relevant when a common TX beam (or TX-RX beam pair) is used for PDSCH and PDCCH, and also a common TX beam (or TX-RX beam pair) for PUSCH and PUCCH. In another example different from diagram 800 is that a TCI state definition is jointly used for PDSCH and PUSCH, and another TCI state definition is jointly used for PDCCH and PUCCH. This is relevant when the UE is capable of beam correspondence wherein a common DL and UL beam pair is used (TX and RX beams are reciprocal). But data and control (at least UE-dedicated or UE-specific control such as that associated with DL assignment or UL grant) beams can be selected independently by the NW.

In another embodiment (I.1.3), the TCI state definition for all the DL channels are jointly configured, and the TCI state definition for all the UL channels are jointly configured. The TCI state definition for DL channels 813 and UL channels 814 are separately configured. An example of this embodiment can be illustrated in diagram 810 of FIG. 8. Here, the TCI-based mechanism links/associates at least one of the RSs from 811 and/or 812 to a particular TCI state for the channel. Such association (815) can take form of the QCL Type D.

In another embodiment (I.1.4), the TCI state definition for all the DL channels and all the UL channels 823 are jointly configured. An example of this embodiment can be illustrated in diagram 820 of FIG. 8. Here, the TCI-based mechanism links/associates at least one of the RSs from 821 and/or 822 to a particular TCI state for the channel. Such association (825) can take form of the QCL Type D. This is relevant when the UE is capable of beam correspondence wherein a common DL and UL beam pair is used (TX and RX beams are reciprocal).

For the second component (that is, UE procedures for beam measurement and reporting), in Rel.15/16 NR, too many options are supported mainly due to the shared framework with CSI acquisition and the need for accommodating a number of (possibly unknown) scenarios. This results not only in heavy RRC configuration but also a burdensome requirement for L1 control signaling. The only way to avoid large overhead is to increase latency, and vice versa. As a result, Rel.15/16 NR does not offer beam management that operates fast enough for scenarios with high mobility and/or large number of beams.

To facilitate fast beam management, a so-called "slim mode" can be designed wherein a streamlined combination of small number of foundational features (building blocks) is used to facilitate beam management with low overhead and low latency.

In the following, three categories of embodiments will be used for illustrative purposes: beam measurement, beam reporting, and beam management framework. Any combination of at least two of the embodiments below is included in the present disclosure.

Several embodiments pertaining to streamlined beam measurement (including RS used for beam measurement) and beam reporting for the "slim mode" are described below.

In one embodiment (II.1.1), the CSI-RS that is configured for beam management (for instance, with or without Repetition ON) comprises frequency density of 3 RE/RB (higher density for accuracy) and one port. Optionally, the CSI-RS that is configured for beam management (for instance, with or without Repetition ON) comprises frequency density of 3 RE/RB (higher density for accuracy) and two ports (e.g. for dual polarized array), the CSI-RS that is configured for beam management (for instance, with or without Repetition ON) comprises frequency density of 1 RE/RB (lower density for accuracy) and one port, the CSI-RS that is configured for beam management (for instance, with or without Repetition ON) comprises frequency density of 1 RE/RB (lower density for accuracy) and two ports (e.g. for dual polarized array).

Optionally, the CSI-RS characteristic can depend on whether the CSI-RS is configured for channel measurement or interference measurement. For example, the NZP CSI-RS configured for channel measurement comprises frequency density of 3 RE/RB (higher density for accuracy) and one port, whereas the NZP CSI-RS configured for interference measurement comprises frequency density of 3 RE/RB (higher density for accuracy) and one port, and whereas the ZP CSI-RS configured for interference measurement comprises frequency density of 1 RE/RB (higher density for accuracy) and one port.

In another embodiment (II.1.2), three different time-domain behaviors for the measurement RS configured for beam management can be supported: periodic (P), semi-persistent (SP), and aperiodic (AP) wherein only SSB can be used for periodic measurement RS, and only CSI-RS (either for channel or interference measurement) can be used for SP and AP. That is, periodic measurement RS can only be SSB, semi-persistent measurement RS can only be SP-CSI-RS, and aperiodic measurement RS can only be AP-CSI-RS.

Optionally, SP-CSI-RS and AP-CSI-RS can be combined into one "aperiodic" mode of operation. In one example, aperiodic trigger and semi-persistent activation/deactivation can be performed using the same DCI field (either in UL-related or DL-related DCI). Here the DCI field for CSI-RS triggering includes at least 3 code points for the following 3 hypotheses: "one CS-RS transmission", "activation", "deactivation". In another example, the DCI field for CSI-RS triggering includes the number of CSI-RS bursts/shots (e.g. 1, 2, 4, 8) for the CSI-RS transmission.

Several embodiments pertaining to streamlined beam reporting for the "slim mode" are described below.

Note that beam reporting can also be considered as a special case of CSI reporting.

Optionally, SP and AP beam reporting can be combined into one "aperiodic" mode of operation. In one example, aperiodic trigger and semi-persistent activation/deactivation can be performed using the same DCI field (either in UL-related or DL-related DCI). Here the DCI field for CSI request includes at least 3 code points for the following 3 hypotheses: "one CSI request", "activation", "deactivation". In another example, the DCI field for CSI request includes the number of beam reports bursts/shots (e.g. 1, 2, 4, 8).

Pertaining to embodiment 11.1.2 and 11.1.3, CSI-RS triggering and CSI request can be performed with a single DCI field if the DCI field is used to select a pre-configured trigger state (just as in Rel.15/16). Optionally, the two functions can be accomplished using two separate DCI fields.

Also pertaining to embodiment 11.1.2 and 11.1.3, beam measurement/reporting modes can be defined in terms of the combination between measurement RS and beam reporting. In this case, there are 5 modes: SP beam reporting with SSB, SP beam reporting with SP-CSI-RS, AP beam reporting with SSB, AP beam reporting with SP-CSI-RS, and AP beam reporting with AP-CSI-RS.

Optionally, to reduce the number of options, if at least one RS is configured for interference measurement, the time-domain behavior for such RS can be configured to match the time-domain behavior for the RS configured for channel measurement.

Several embodiments pertaining to streamlined beam management framework for the "slim mode" are described below.

In one embodiment (II.2.1), the measurement RS configured for beam management can be enumerated in terms of ports. In terms of use case, one TX beam (DL and/or UL) is associated with one port (or either one or two ports). Note that in Rel.15/16 NR, one beam is associated with CSI-RS resource which comprise of one or two ports. For beam management, this abstraction is unnecessary and can be removed. Furthermore, when at least two TX beams are configured to be associated with a same RX beam (hence QCL Type D), those N beams (corresponding to N ports, or at most 2N ports) can be grouped as one "port-group" or "port-set". This replaces the so-called CSI-RS resource set in Rel.15/16 NR. In other words, the three-level hierarchy of measurement RS in Rel.15/16 NR (port→CSI-RS resource→CSI-RS resource set) is replaced with the following two-level hierarchy: port→port-group/set. Optionally, a proper QCL configuration that links at least two ports with QCL Type D can be used thereby removing the need for "port-group", or "port-set".

Optionally, the following two-level hierarchy can be used: port→CSI-RS resource. In this case, one CSI-RS resource can comprise either one or two ports, or only one port. A proper QCL configuration that links at least two CSI-RS resources with QCL Type D can be used thereby removing the need for CSI-RS resource set.

For the third component (that is, UE procedures for DL beam indication), several embodiments pertaining to DL TX beam indication via DL TCI field in a DCI for the "slim mode" are described below, In any of the embodiments below, the DCI field "DL TCI" can be included either in DL-related DCI, UL-related DCI, or non-grant/assignment carrying DCI. Furthermore, for a given DL slot/sub-frame/time-unit, the UE assumes the TCI state (which corresponds to DL TX beam) that corresponds to the latest (most recent) applicable TCI state indicated in the most recent applicable TCI field. Furthermore, the DL TX beam selection for PDSCH and PDCCH (at least for PDCCH used for the purpose of UE-specific control reception) are signaled via L1 DL control signaling (unlike Rel.15/16 wherein the DL TX beam selection for PDCCH is signaled via MAC CE).

Figure 9:
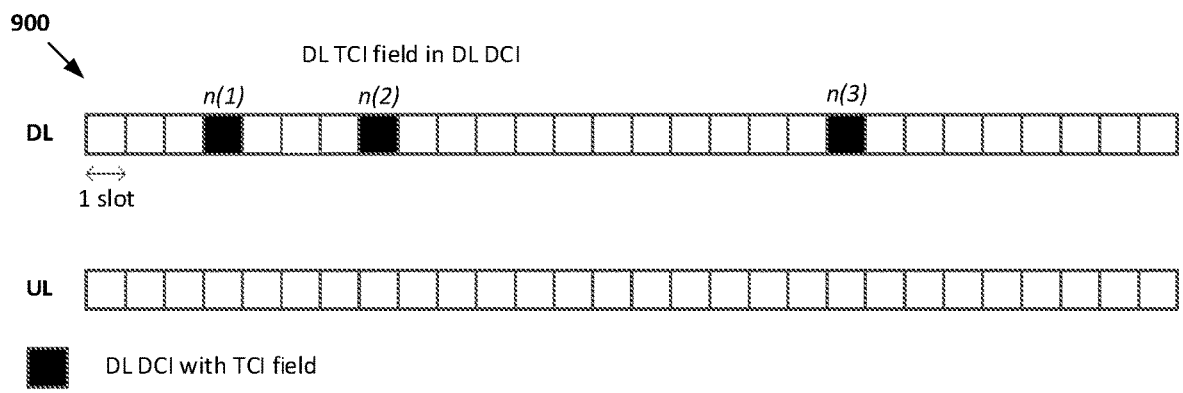
FIG. 9 illustrates an example timing diagram for a joint TCI update for a physical downlink shared channel (PDSCH) and a PDCCH according to one or more embodiments of the present disclosure.

FIG. 9 illustrates an example timing diagram for a joint TCI update for a PDSCH and a PDCCH according to one or more embodiments of the present disclosure. The embodiments shown in FIG. 9 are for illustration only. Other embodiments can be used without departing from the scope of the present disclosure.

In one embodiment (III.1.1), the TCI state (which can be represented by a TCI state ID) indicated in the TCI field applies both PDSCH and PDCCH (at least for PDCCH used for the purpose of UE-specific control reception), and the TCI state indicates the DL TX beam (which corresponds to a source/reference RS) used for both PDSCH and PDCCH. That is, the same TX beam can be shared by PDSCH and PDCCH. Here there are a few options in terms of the timing relationship.

In a first option, the latest applicable TCI state for PDSCH includes the one possibly signaled in the same DL slot/sub-frame/time-unit as that with a respective DL assignment (carried via PDCCH) while the latest applicable TCI state for PDCCH (at least for PDCCH used for the purpose of UE-specific control reception) does not include the one possibly signaled in the same DL slot/sub-frame/time-unit as that with a respective DL assignment (carried via PDCCH). This is because for the UE to be able to receive the PDCCH in the current DL slot/sub-frame/time-unit, the UE needs to know the DL TX beam prior to decoding the DCI that possibly carries the TCI field. This can be illustrated in timing diagram 900 of FIG. 9 wherein the DL TCI field (in the DL DCI) signaled in slot n(1) indicates the DL TX beam for PDSCH transmission in slot n(1) and the 3 consecutive slots after n(1), not including slot n(2). It also indicates the DL TX beam for PDCCH in the 4 consecutive slots after n(1), including slot n(2). Likewise, the TCI field signaled in slot n(2) indicates the DL TX beam for PDSCH transmission in slot n(2) and the 11 consecutive slots after n(2), not including slot n(3). It also indicates the DL TX beam for PDCCH in the 11 consecutive slots after n(2), including slot n(3). This first option is especially relevant when the DCI field "DL TCI" can be included either in DL-related DCI (associated with a DL assignment) or UL-related DCI (associated with an UL grant) (cf. embodiment III.2.1).

In a second option, the latest applicable TCI state for PDSCH is identical to that for PDCCH (at least for PDCCH used for the purpose of UE-specific control reception), and does not include the one possibly signaled in the same DL slot/sub-frame/time-unit as that with a respective DL assignment (carried via PDCCH). This first option is especially relevant when the DCI field "DL TCI" can be included in a DCI without any DL assignment (cf. embodiment III.2.2). In one example, DCI format 1_0 of NR can be used for carrying the associated DL assignment while the TCI state applicable for this DL assignment is received in one of the previous and latest slot/subframe/time-unit and signaled via a DCI without any DL assignment or UL grant. This could be a DCI format dedicated for TCI signaling. In another example, DCI format 1_0 of NR can be used for carrying the associated DL assignment while the TCI state applicable for this DL assignment is received in one of the previous and latest slot/subframe/time-unit and signaled via an UL-related DCI (which either includes or does not include an UL grant).

In another embodiment (III.1.2), the TCI state (which can be represented by a TCI state ID) indicated in the TCI field applies both PDSCH and PDCCH (at least for PDCCH used for the purpose of UE-specific control reception), but the DL TX beam used for PDSCH can be different from PDCCH. Here the DL TX beam for PDSCH and PDCCH are tightly QCL-ed, i.e. the QCL (e.g. Type D, spatially linked) links the source/reference RSs for PDSCH to those for PDCCH. This QCL linking can be performed via RRC, MAC CE, or L1 DL control signaling (via either UE-group DCI or UE-specific DCI). In one example, the CSI-RS "ports" used for PDCCH is linked with CSI-RS "ports" used for PDSCH in one-to-many (e.g. 1-to-M) mapping. That is, PDCCH uses coarse TX beam while PDSCH uses finer beam but the two TX beams are linked. In this case, the TCI field directly indicates the finer (PDSCH) TX beam (associated with the source/reference RS) while the TX beam for PDCCH is indicated by association wherein M PDSCH beams correspond to 1 PDCCH beam, e.g. the associated PDCCH beam pattern can be the combination of M narrower PDSCH beams. This association between PDCCH and PDSCH beams can be fixed, pre-determined by a set of rules, or configured via higher-layer signaling (RRC and/or MAC CE).

Likewise, there are a few options in terms of the timing relationship. In a first option, the latest applicable TCI state for PDSCH includes the one possibly signaled in the same DL slot/sub-frame/time-unit as that with a respective DL assignment (carried via PDCCH) while the latest applicable TCI state for PDCCH does not include the one possibly signaled in the same DL slot/sub-frame/time-unit as that with a respective DL assignment (carried via PDCCH). This is because for the UE to be able to receive the PDCCH in the current DL slot/sub-frame/time-unit, the UE needs to know the DL TX beam prior to decoding the DCI that possibly carries the TCI field.

Several embodiments pertaining to the transmission of DL TX beam indication for the "slim mode" are described below.

In one embodiment (III.2.1), the DL TX beam indication (carried by the DL TCI field, indicating the TCI state associated with the selected source/reference RS) is transmitted in a DCI accompanied with DL assignment or UL grant (note that Rel.15/16 NR does not support TCI field in UL grant).

Figure 10:
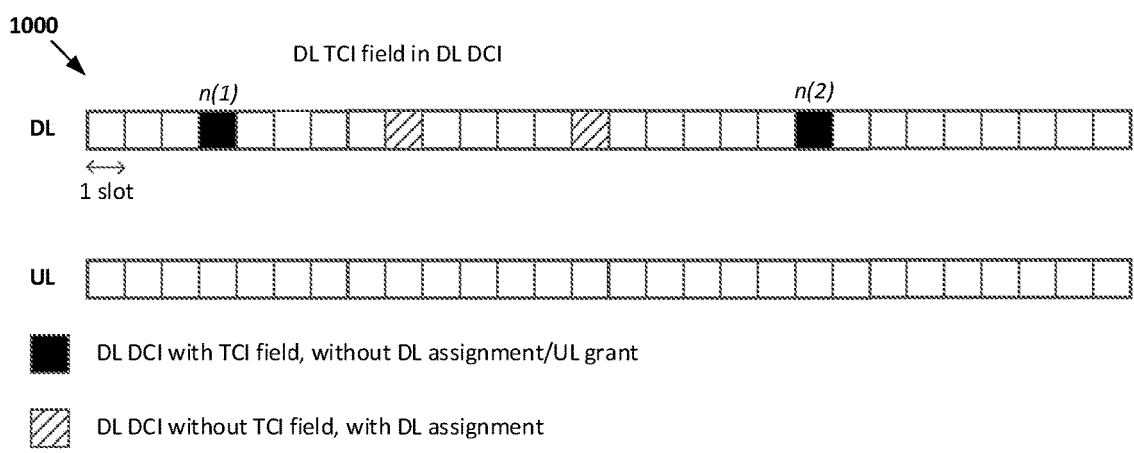
FIG. 10 illustrates an example timing diagram for a joint TCI update for a PDSCH and a PDCCH according to one or more embodiments of the present disclosure.

FIG. 10 illustrates an example timing diagram 100 for a joint TCI update for a PDSCH and a PDCCH according to one or more embodiments of the present disclosure. The embodiments shown in FIG. 10 are for illustration only. Other embodiments can be used without departing from the scope of the present disclosure.

In another embodiment (III.2.2), the DL TX beam indication (carried by the DL TCI field, indicating the TCI state associated with the selected source/reference RS) is transmitted in a DCI without any DL assignment or UL grant (note that Rel.15/16 NR does not support TCI field in UL grant, and DCI format 1_0). In one example, the DCI used for this purpose can be a purpose-designed UE-specific DCI or an existing small format in Rel.15/16 (such as the one used for power control). In another example, UE-group DCI can be used to group the TCI signaling from a set of UEs without any DL assignment or UL grant.

This can be illustrated in timing diagram 1000 of FIG. 10 wherein the DL TCI field (in the DL DCI) signaled in slot n(1) indicates the DL TX beam for PDSCH transmission in slot n(1) up to slot n(2) but not including slot n(2). Therefore, the DL TX beam indicated in slot n(1) applies to the two DL assignments in the $5^{th}$ and the $10^{th}$ slots after.

In another embodiment (III.2.3), the DL TX beam indication (carried by the DL TCI field, indicating the TCI state associated with the selected source/reference RS) can be transmitted in a DCI with and/or without any DL assignment or UL grant (note that Rel.15/16 NR does not support TCI field in UL grant).

Respectively, any combination of at least one of the embodiments in category III.1 and at least one of the embodiments in category III.2 is included in the present disclosure. For example, if embodiment III.1.1 is used together with embodiment III.2.2, the DL TX beam for PDCCH (at least for PDCCH used for the purpose of UE-specific control reception) is identical to that for PDSCH. If embodiment III.1.1 is used together with embodiment III.2.1 when the DCI including the TCI field is a DL-related DCI, the DL TX beam for PDCCH is one update behind from that for PDSCH. That is, the DL TX beam indicated in the slot/subframe/time-unit of the DCI applies to the DL assignment (PDSCH) in the same slot/subframe/time-unit but will apply only to the next PDCCH reception.

The following are embodiments that apply to any of the above embodiments (in category III.1 or III.2, or any combination thereof). For instance, any of the following embodiments can be used regardless whether DL TX beam indication is accompanied with DL assignment or UL grant.

In one embodiment (III.3.1), the TCI field indicates the selected TCI state (which can be represented by a TCI state ID) wherein one TCI state is associated with a sequence of source/reference RS (port) indices representing a sequence of DL TX beams the UE assumes over a period of time. Here, a source/reference RS (port) index can be associated with a slot/subframe/time-unit number. In one example, the number of reference RS indices in the sequence along with the length of the time period (possibly including periodicity and/or offset) can be configured via higher-layer signaling (RRC and/or MAC CE). This configuration can be separate or together with the TCI state definition. When receiving this indication, the UE assumes that the DL TX beam switches (or sweeps) over the period of time according to the configured sequence. This is intended to facilitate beam refinement and switching over a longer period of time with only one DL beam indication signaling especially when the UE moves at a predictable speed and/or trajectory relative to the gNB or the NW.

For the fourth component (that is, UE procedures for UL beam indication), several embodiments pertaining to UL TX beam indication for the "slim mode" are described below.

In one embodiment (IV.1.1), the UL TX beam indication is given by the latest (most recent) applicable TCI state indicated in the latest (most recent) applicable TCI field that is used for DL TX beam indication. This scheme is especially relevant when the UE is capable of (supports) beam correspondence wherein UL TX beam corresponds to DL RX beam, and therefore can be inferred from DL TX beam once the UE completes a phase of DL beam training (by measuring CSI-RS configured for beam management and with Repetition ON). In this case, UL beam indication and DL beam indication are jointly performed.

Analogous to embodiment III.1.1/1.2, PUSCH and PUCCH can share the same UL TX beam, or can be tightly QCL-ed (spatially linked). In this case, the TX beam for PDSCH, PDCCH (at least for PDCCH used for the purpose of UE-specific control reception), PUSCH, PUCCH can be inferred from the latest (common) applicable TCI field.

In another embodiment (IV.1.2), separate UL TCI field (from DL TCI field) can be used. Here, either separate or joint DL-UL TCI state configuration can be used, but separate TCI state subset selection for DL and UL TX beam indication will be needed. This scheme is especially relevant when the UE is not capable of (does not support) beam correspondence.

Analogous to embodiment III.1.1/1.2, PUSCH and PUCCH can share the same UL TX beam, or can be tightly QCL-ed (spatially linked). In this case, the TX beam for PDSCH, PDCCH (at least for PDCCH used for the purpose of UE-specific control reception), PUSCH, PUCCH can be inferred from the latest (common) applicable TCI field.

In another embodiment (IV.1.3), given the latest (most recent) applicable TCI state indicated in the latest (most recent) applicable TCI field for DL TX beam indication, a small subset of values for UL TCI states is also indicated. This scheme is especially relevant when the UE is capable of (support) partial beam correspondence. That is, a small subset of UL TCI states can be configured to be spatially related to a DL TCI state thereby potentially reducing the UL TCI indication payload. Conversely, a small subset of DL TCI states can be configured to be spatially related to an UL TCI state thereby potentially reducing the DL TCI indication payload. The partial correlation (spatial relation) can be configured via higher-layer signaling (via RRC or MAC CE) or L1 control signaling (via UE-group DCI). Here, an UL TCI field can be used.

Several embodiments pertaining to the transmission of UL TX beam indication applicable for either embodiment IV.1.2 or embodiment IV.1.3 for the "slim mode" are described below.

In one embodiment (IV.2.1), the UL TX beam indication (carried by the UL TCI field, indicating the TCI state associated with the selected source/reference RS) is transmitted in a DCI accompanied with DL assignment or UL grant (note that Rel.15/16 NR does not support TCI field in UL grant).

In another embodiment (IV.2.2), the UL TX beam indication (carried by the UL TCI field, indicating the TCI state associated with the selected source/reference RS) is transmitted in a DCI without any DL assignment or UL grant (note that Rel.15/16 NR does not support TCI field in UL grant). In one example, the DCI used for this purpose can be a purpose-designed UE-specific DCI or an existing small format in Rel.15/16 (such as the one used for power control). In another example, UE-group DCI can be used to group the TCI signaling from a set of UEs without any DL assignment or UL grant.

In another embodiment (IV.2.3), the UL TX beam indication (carried by the UL TCI field, indicating the TCI state associated with the selected source/reference RS) can be transmitted in a DCI with or without any DL assignment or UL grant (note that Rel.15/16 NR does not support TCI field in UL grant).

The following are embodiments that apply to any of the above embodiments (in category IV.1 or IV.2, or any combination thereof). For instance, any of the following embodiments can be used regardless whether UL TX beam indication is accompanied with DL assignment or UL grant.

In one embodiment (IV.3.1), the TCI field indicates the selected TCI state wherein one TCI state is associated with a sequence of source/reference RS (port) indices representing a sequence of UL TX beams the UE assumes over a period of time. In one example, the number of reference RS indices in the sequence along with the length of the time period (possibly including periodicity and/or offset) can be configured via higher-layer signaling (RRC and/or MAC CE). This configuration can be separate or together with the TCI state definition. When receiving this indication, the UE assumes that the UL TX beam switches (or sweeps) over the period of time according to the configured sequence. This is intended to facilitate beam refinement and switching over a longer period of time with only one UL beam indication signaling especially when the UE moves at a predictable speed and/or trajectory relative to the gNB or the NW.

Any of the above variation embodiments can be utilized independently or in combination with at least one other variation embodiment.

Figure 11:
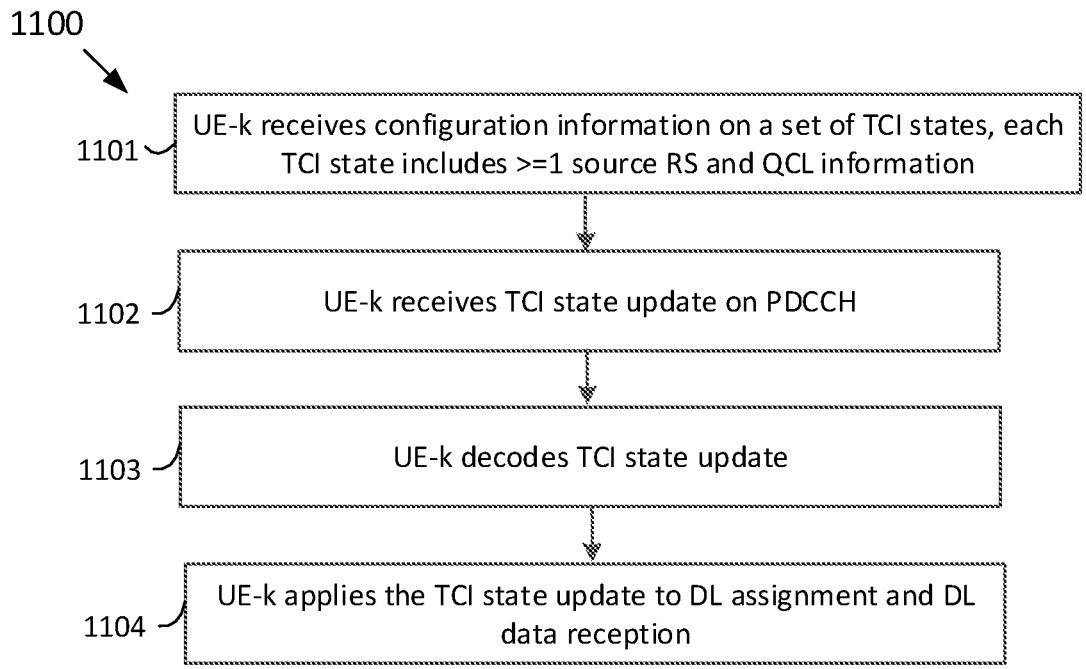
FIG. 11 illustrates a flowchart for an example method wherein a UE receives configuration information on a set of TCI states according to one or more embodiments of the present disclosure.

FIG. 11 illustrates a flowchart for an example method 1100 wherein a UE receives configuration information on a set of TCI states according to an embodiment of the present disclosure. For example, the method 1100 can be performed by the UE 116. The embodiment of the method 1100 shown in FIG. 11 is for illustration only.

The method 1100 begins with the UE (termed UE-k) receiving, from a base station, configuration information on a set of TCI states (step 1101), wherein each of the TCI states refers to at least one source RS with a corresponding QCL, and is associated with DL data and UE-specific DL control information. Subsequently, UE-k receives, on PDCCH, a TCI state update (step 1102) and decodes it (step 1103). The decoded TCI state update is then applied to a reception of DL data and a corresponding UE-specific DL assignment (step 1104).

The TCI state update can be signaled via a DL-related DCI that includes a previously received DL assignment. Optionally, the TCI state update can be signaled via a specific-purpose DCI for TCI state update.

The designated DCI can be UE-specific and can only be decoded by the designated UE. In this case, the TCI state update is also applied to a transmission of UL data and a PUCCH allocated to the designated UE. Optionally, a separate TCI state and TCI state update are used for a transmission of UL data and a PUCCH allocated to the UE. Optionally, the designated DCI is UE-group DCI and can be decoded by a plurality of UEs, one of which is the designated UE.

Figure 12:
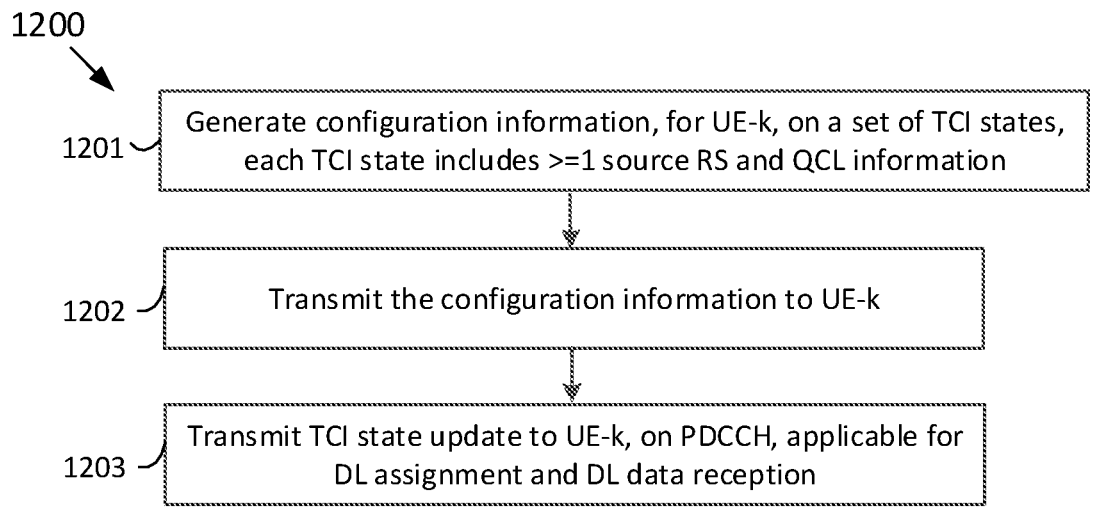
FIG. 12 illustrates a flowchart for an example method wherein a BS generates a configuration information on a set of TCI states according to one or more embodiments of the present disclosure.

FIG. 12 illustrates a flowchart for an example method 1200 wherein a BS generates configuration information on a set of TCI states to a UE (labeled as UE-k) according to an embodiment of the present disclosure. For example, the method 1200 can be performed by the BS 102. The embodiment of the method 1200 shown in FIG. 12 is for illustration only.

The method 1200 begins with the BS generating, to UE-k, configuration information on a set of TCI states (step 1201), wherein each of the TCI states refers to at least one source RS with a corresponding QCL, and is associated with DL data and UE-specific DL control information. Subsequently, the BS transmits the configuration information to UE-k (step 1202). The BS also transmits, to UE-k, a TCI state update (step 1103) on PDCCH wherein the TCI state update is applied to a reception of DL data and a corresponding UE-specific DL assignment.

The TCI state update can be signaled via a DL-related DCI that includes a previously received DL assignment. Optionally, the TCI state update can be signaled via a specific-purpose DCI for TCI state update.

The designated DCI can be UE-specific and can only be decoded by the designated UE. In this case, the TCI state update is also applied to a transmission of UL data and a PUCCH allocated to the designated UE. Optionally, a separate TCI state and TCI state update are used for a transmission of UL data and a PUCCH allocated to the UE. Optionally, the designated DCI is UE-group DCI and can be decoded by a plurality of UEs, one of which is the designated UE.

Although FIGS. 11 and 12 illustrate examples of methods for receiving configuration information and configuring a UE, respectively, various changes can be made to FIGS. 11 and 12. For example, while shown as a series of steps, various steps in each figure can overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to:
receive, from a base station, configuration information including information on a set of transmission configuration indicator (TCI) states, each of the TCI states providing at least one reference signal (RS) with a quasi co-location (QCL) for a RS of a physical downlink shared channel (PDSCH) and a RS of a physical downlink control channel (PDCCH);
receive, from the base station, activation information on a subset of the TCI states;
receive, from the base station, downlink (DL) related downlink control information (DCI), without a DL assignment, including information indicating a TCI state among the subset of the TCI states; and
transmit, to the base station, an uplink (UL) signal using an UL transmit (TX) spatial filter based on the indicated TCI state.

2. The UE of claim 1, wherein the transceiver is further configured to:
receive, from the base station, DL related DCI with the DL assignment; and
receive, from the base station, a DL signal based on the indicated TCI state.

3. The UE of claim 2, wherein the indicated TCI state is a joint TCI state used for reception of the DL signal and for transmission of the UL signal.

4. The UE of claim 1, wherein the indicated TCI state is commonly used for DL reception on the PDSCH and the PDCCH.

5. The UE of claim 1, wherein the indicated TCI state is commonly used for UL transmission on a physical uplink shared channel (PUSCH) and a physical uplink control channel (PUCCH).

6. The UE of claim 1, wherein the configuration information is received through radio resource control (RRC) signaling, and the activation information is received through a medium access control-control element (MAC-CE).

7. A base station (BS) comprising:
a transceiver configured to:
- transmit configuration information including information on a set of transmission configuration information (TCI) states, each of the TCI states providing at least one reference signal (RS) with a quasi co-location (QCL) for a RS of a physical downlink shared channel (PDSCH) and a RS of a physical downlink control channel (PDCCH), and
- transmit, to a user equipment (UE), activation information on a subset of the TCI states;
- transmit, to the UE, downlink (DL) related downlink control information (DCI), without DL assignment, including information indicating a TCI state among the subset of the TCI states; and
- receive, from the UE, an uplink (UL) signal based on the indicated TCI state.

8. The BS of claim 7, wherein the transceiver is further configured to:
- transmit, to the UE, DL related DCI with the DL assignment; and
- transmit, to the UE, a DL signal based on the indicated TCI state.

9. The BS of claim 8, wherein the indicated TCI state is a joint TCI state used for transmission of the DL signal and for reception of the UL signal.

10. The BS of claim 7, wherein the indicated TCI state is commonly used for DL transmission on the PDSCH and the PDCCH.

11. The BS of claim 7, wherein the indicated TCI state is commonly used for UL reception on a physical uplink shared channel (PUSCH) and a physical uplink control channel (PUCCH).

12. The BS of claim 7, wherein the configuration information is transmitted through radio resource control (RRC) signaling, and the activation information is transmitted through a medium access control-control element (MAC-CE).

13. A method for operating a user equipment (UE), the method comprising:
- receiving, from a base station, configuration information including information on a set of transmission configuration information (TCI) states, each of the TCI states providing at least one source reference signal (RS) with a quasi co-location (QCL) for a RS of a physical downlink shared channel (PDSCH) and a RS of a physical downlink control channel (PDCCH);
- receiving, from the base station, activation information on a subset of the TCI states;
- receiving, from the base station, downlink (DL) related downlink control information (DCI), without a DL assignment, including information indicating a TCI state among the subset of the TCI states; and
- transmitting, to the base station, an uplink (UL) signal using an UL transmit (TX) spatial filter based on the indicated TCI state.

14. The method of claim 13, further comprising:
- receiving, from the base station, DL related DCI with the DL assignment; and
- receiving, from the base station, a DL signal based on the indicated TCI state.

15. The method of claim 14, wherein the indicated TCI state is a joint TCI state used for reception of the DL signal and for transmission of the UL signal.

16. The method of claim 13, wherein the indicated TCI state is commonly used for DL reception on the PDSCH and the PDCCH.

17. The method of claim 13, wherein the indicated TCI state is commonly used for UL transmission on a physical uplink shared channel (PUSCH) and a physical uplink control channel (PUCCH).

18. The method of claim 13, wherein the configuration information is received through radio resource control (RRC) signaling, and the activation information is received through a medium access control-control element (MAC-CE).

* * * * *